US012734525B2

(12) United States Patent
Lim

(10) Patent No.: US 12,734,525 B2
(45) Date of Patent: Sep. 15, 2026

(54) REAGENT VESSEL AND REAGENT VESSEL ASSEMBLY COMPRISING SAME

(71) Applicant: JOONGKYEOM CO., LTD., Ilsandong-gu (KR)

(72) Inventor: Myung Woon Lim, Ilsandong-gu (KR)

(73) Assignee: JOONGKYEOM CO., LTD. (KR)

( * ) Notice: Subject to any disclaimer, the term of this patent is extended or adjusted under 35 U.S.C. 154(b) by 362 days.

(21) Appl. No.: 18/262,572

(22) PCT Filed: Mar. 22, 2022

(86) PCT No.: PCT/KR2022/003957
§ 371 (c)(1),
(2) Date: Jul. 30, 2024

(87) PCT Pub. No.: WO2022/203339
PCT Pub. Date: Sep. 29, 2022

(65) Prior Publication Data

US 2025/0018398 A1 Jan. 16, 2025

(30) Foreign Application Priority Data

Mar. 22, 2021 (KR) ........................ 10-2021-0036536

(51) Int. Cl.
*B01L 3/00* (2006.01)

(52) U.S. Cl.
CPC ......... *B01L 3/523* (2013.01); *B01L 2200/025* (2013.01); *B01L 2200/04* (2013.01); *B01L 2200/16* (2013.01); *B01L 2300/046* (2013.01)

(58) Field of Classification Search
CPC ............... B01L 3/523; B01L 2200/025; B01L 2200/04; B01L 2200/16; B01L 2300/046;
(Continued)

(56) References Cited

U.S. PATENT DOCUMENTS 7,845,845 B1 * 12/2010 Kelly ...................... B01F 35/42 215/373
2010/0145287 A1 * 6/2010 Grevin .................. A61F 9/0008 604/295
(Continued)

FOREIGN PATENT DOCUMENTS

CN 201418685 Y * 3/2010
CN 103482168 A * 1/2014
(Continued)

OTHER PUBLICATIONS

Office Action Received in Chinese Application No. 202280013721.9 mailed Jul. 3, 2025, 5 pages.
(Continued)

*Primary Examiner* — Bob Zadeh

(57) ABSTRACT

A reagent vessel of the present invention comprises: a bottle in which a reagent is contained; a Pasteur pipette which is inserted into an open end of the bottle and has a nozzle through which the reagent is discharged; a cap which closes the Pasteur pipette and is fastened to the bottle; and a magnetic mold which is coupled to the bottle.
Accordingly, the present invention provides an advantage in that the reagent vessel having a magnet attached thereto can stick to a steel holder, and thus it is possible to stably hold the reagent vessel so as to maintain the reagent vessel in an upright state during use and storage thereof.

5 Claims, 5 Drawing Sheets

(58) Field of Classification Search
CPC .... B01L 3/0272; B01L 9/06; B01L 2300/042; B01L 2300/0609; B01L 2300/0832; B01L 9/04; B65D 23/001; B65D 47/18; B65D 2313/04; B65D 5/52; G01N 35/1002
See application file for complete search history.

(56) References Cited

U.S. PATENT DOCUMENTS

| | | | | |
|---|---|---|---|---|
| 2013/0217134 | A1* | 8/2013 | Quetua | G01N 21/79 436/55 |
| 2023/0083963 | A1* | 3/2023 | Marra | B01F 35/7544 222/190 |

FOREIGN PATENT DOCUMENTS

| | | | | |
|---|---|---|---|---|
| CN | 203473405 | U | * | 3/2014 |
| CN | 106038311 | A | * | 10/2016 |
| CN | 206577780 | U | | 10/2017 |
| CN | 208800139 | U | | 4/2019 |
| CN | 2019-21260430 | U | | 8/2019 |
| CN | 2019-22245103 | U | | 12/2019 |
| CN | 210700169 | U | * | 6/2020 |
| FR | 1020030063381 | A | | 7/2003 |
| IN | 2008068775 | A2 | | 12/2007 |
| JP | 1982090740 | U | | 6/1982 |
| JP | 62-069434 | U | | 5/1987 |
| JP | 1987069434 | U | | 5/1987 |
| JP | 2004513038 | A | | 4/2004 |
| JP | 2014015260 | A | * | 1/2014 |
| KR | 2020020021806 | | | 10/2002 |
| KR | 10-2003-0063381 | A | | 7/2003 |
| KR | 2020030028049 | | | 9/2003 |
| KR | 10-2016-0019185 | A | | 2/2016 |
| KR | 101601461 | B1 | * | 3/2016 |
| KR | 10-2018-0130146 | A | | 12/2018 |

OTHER PUBLICATIONS

Non-Final Office Action in Japanese Application No. 2023-544655 mailed Jun. 20, 2024, 6 pages.

Search Report for Application No. PCT/KR2022/003957. 4 pages.

* cited by examiner

REAGENT VESSEL AND REAGENT VESSEL ASSEMBLY COMPRISING SAME

TECHNICAL FIELD

The present invention relates to a reagent vessel and a reagent vessel assembly comprising the same, and more particularly, to a reagent vessel capable of safely storing a reagent and a reagent vessel assembly comprising the same.

BACKGROUND ART

Various reagents used in various experiments or research are equipped in a laboratory or research office.

Most of these reagents are stored in reagent vessels, and in order to easily find and safely store the reagents, it is necessary to arrange the reagent vessels in predetermined positions.

Conventionally, the reagent vessels are arranged and stored in a reagent storage cabinet having a general storage cabinet shape.

In addition, when the reagent vessels are arranged, it is good to sort, arrange, and store reagents by use or property, and thus, the reagent vessels are sorted in square plastic containers and the like by use or property, and then the reagents are arranged and stored in the form of storing the square plastic containers and the like in the reagent storage cabinet.

When using the reagent stored as such, the plastic container itself is withdrawn from the storage cabinet, and the reagent in the reagent vessel is discharged and used with a Pasteur pipette or the like.

The plurality of reagent vessels may be arranged even if these plastic containers and the like are not stored in the reagent storage cabinet.

However, conventional plastic containers and the like for storing reagent vessels have a problem in that the reagent vessels may contact each other or the reagent vessels may shake, resulting in safety accidents.

That is, when an impact is applied while the reagent vessels are in contact with each other, the reagent vessels may break or the reagents may leak.

In addition, when the reagent is used, a cap of the reagent vessel is maintained in an unlocked state, and thus, the leakage of the reagent frequently occurs when the reagent vessel falls downs.

Therefore, there is a demand for the development of a reagent vessel capable of being stably held even when the reagent is used, and a reagent vessel assembly having the same.

DISCLOSURE

Technical Problem

An object of the present invention is to provide a reagent vessel capable of being stably held so as to maintain the reagent vessel in an upright state during use and storage thereof and a reagent vessel assembly including the same.

Technical Solution

In order to achieve the object, a reagent vessel of the present invention includes: a bottle in which a reagent is contained; a Pasteur pipette which is inserted into an open end of the bottle and has a nozzle through which the reagent is discharged; a cap which closes the Pasteur pipette and is fastened to the bottle; and a magnetic mold which is coupled to the bottle.

In addition, a magnet accommodating groove may be formed inside the magnetic mold, and a magnet may be accommodated in the magnet accommodating groove.

In addition, a pair of flanges surrounding the bottle may be formed in the magnetic mold.

In addition, the nozzle of the Pasteur pipette may be formed to have a cross-sectional area to be decreased toward the end, and the nozzle may extend to the inside of the Pasteur pipette to form a protruding extension end.

In addition, the through hole of the nozzle may be formed across from the end to the extension end.

A reagent vessel assembly according to the present invention includes a holder made of steel; and the aforementioned reagent vessel held on the holder, in which the reagent vessel is struck to the steel holder by magnetic force to be maintained in a upright state.

In addition, the holder may be formed to be bent in a '¬' shape.

Advantageous Effects

According to the reagent vessel and the reagent vessel assembly including the same according to the present invention, it is possible to provide an advantage in that the reagent vessel having a magnet attached thereto may stick to a steel holder to stably hold the reagent vessel so as to maintain the reagent vessel in an upright state during use and storage thereof.

At this time, it is possible to prevent the leakage of the reagent by maintaining stably the reagent vessel in the upright state by magnetic force even while the cap of the reagent vessel is removed.

MODES OF THE INVENTION

Hereinafter, a preferred embodiment of the present invention will be described in detail with reference to the accompanying drawings.

Figure 1:
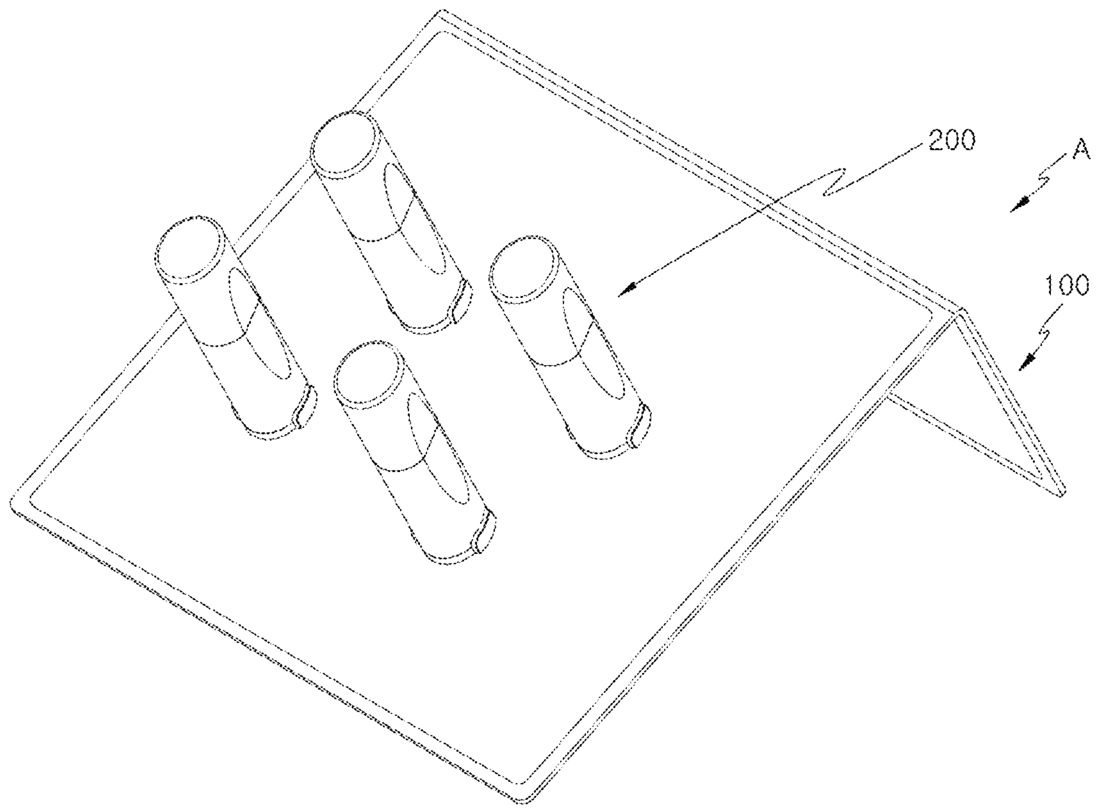
FIG. 1 is a perspective view illustrating a reagent vessel assembly according to the present invention.
Figure 2:
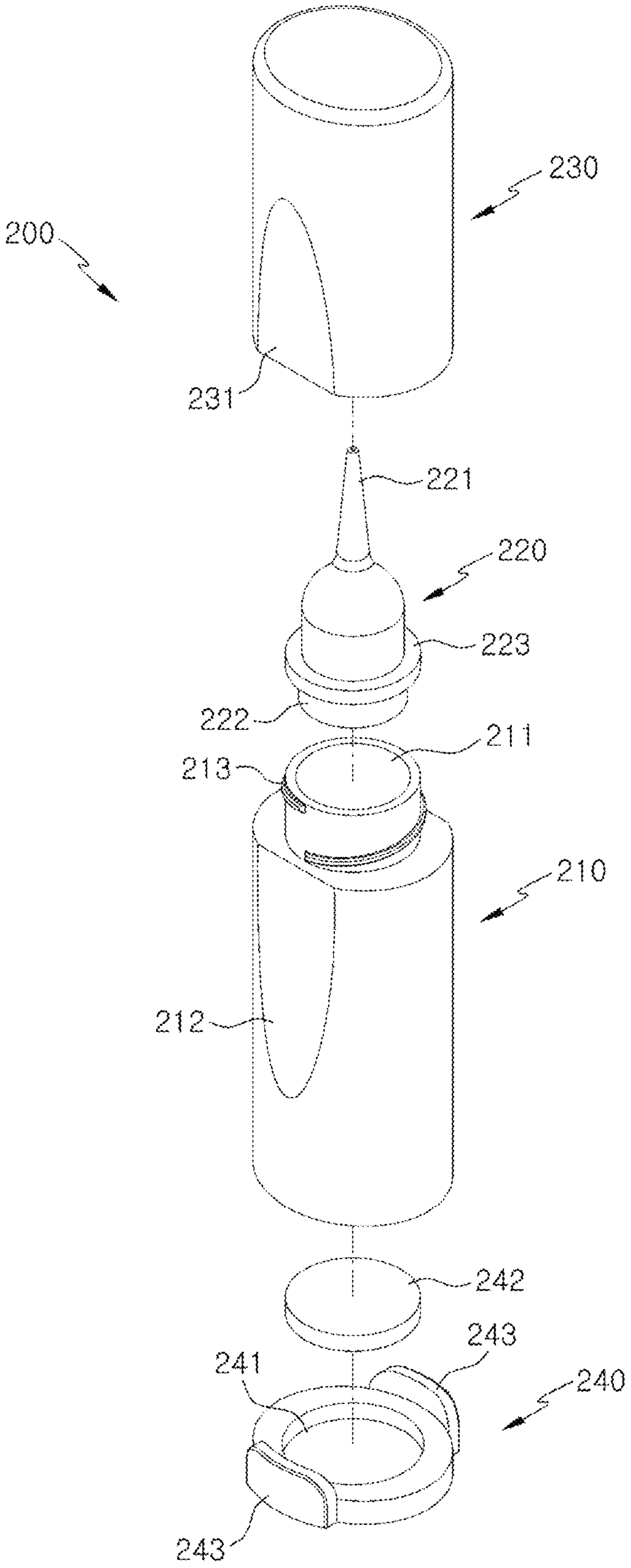
FIG. 2 is an exploded perspective view illustrating a reagent vessel according to the present invention.
Figure 3:
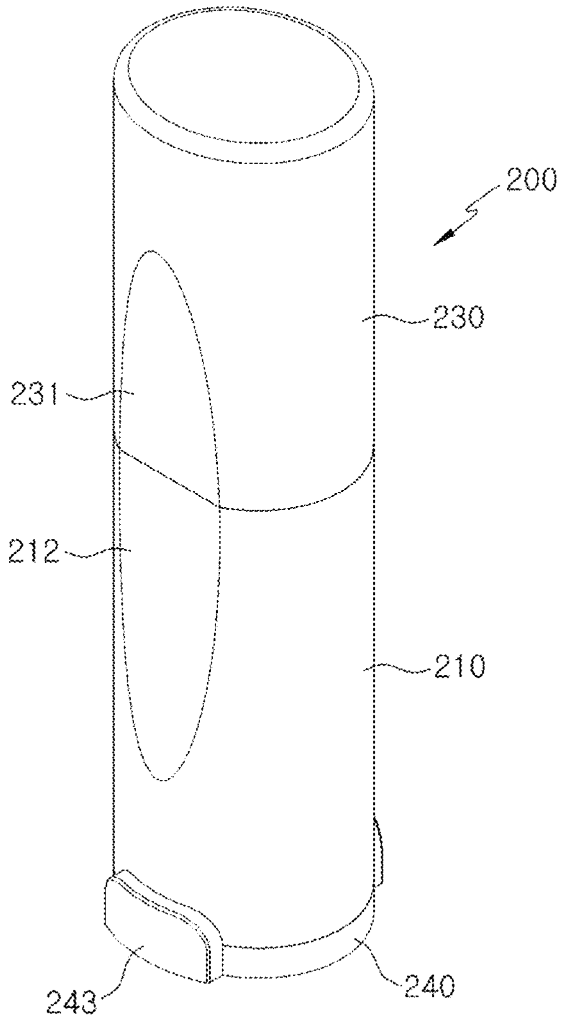
FIG. 3 is a perspective view illustrating a coupling state of FIG. 2.
Figure 4:
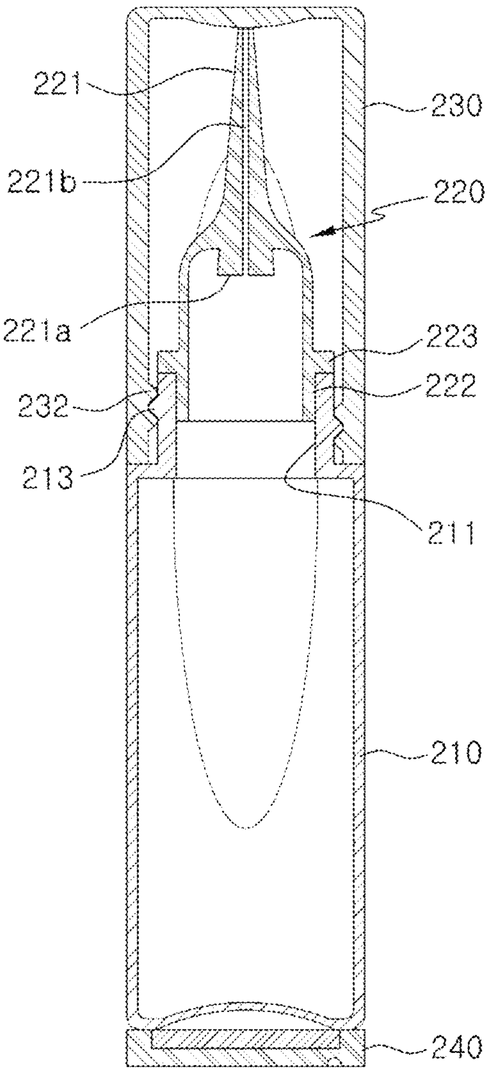
FIG. 4 is a cross-sectional view of FIG. 3.
Figure 5:
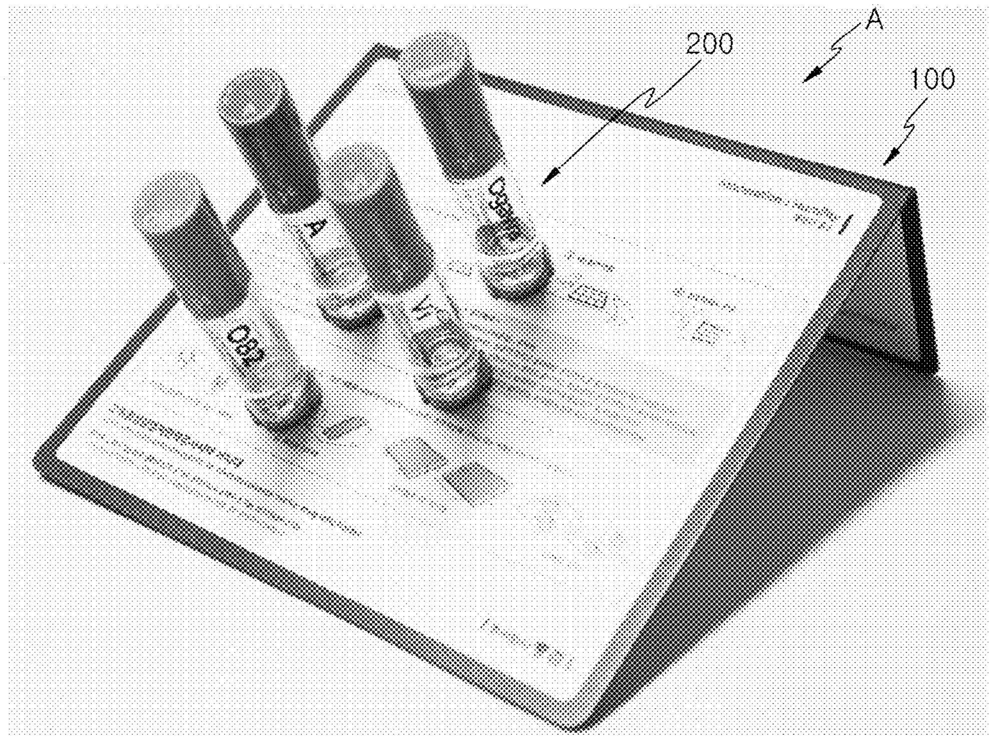
FIGS. 5 and 6 are used state diagrams of a reagent vessel assembly according to the present invention.
Figure 6:
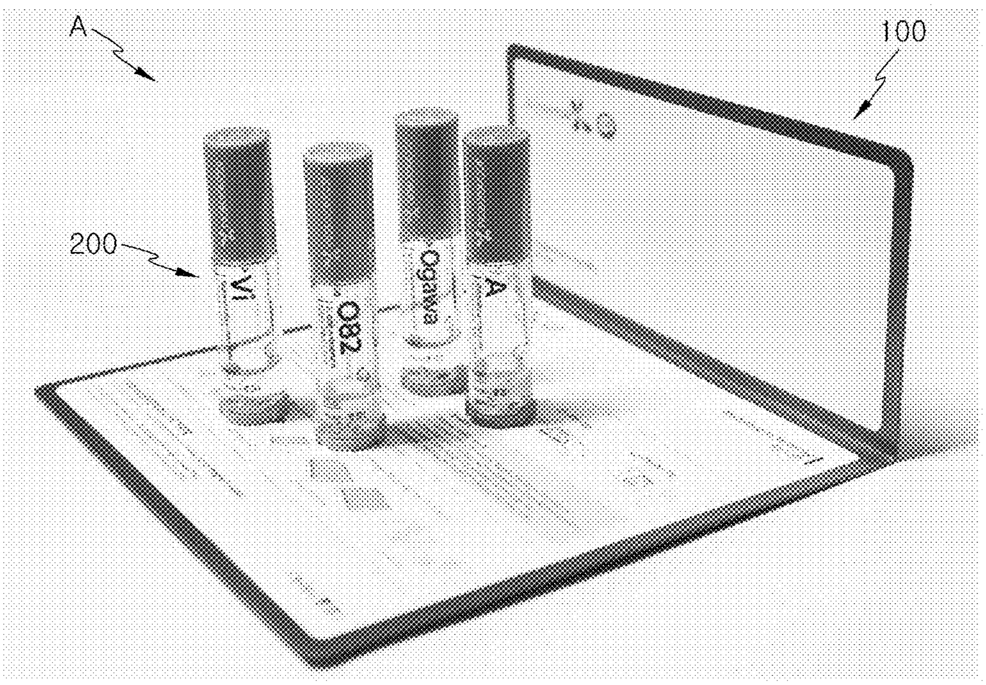

FIG. 1 is a perspective view illustrating a reagent vessel assembly according to the present invention, FIG. 2 is an exploded perspective view illustrating a reagent vessel according to the present invention, FIG. 3 is a perspective view illustrating a coupling state of FIG. 2, FIG. 4 is a cross-sectional view of FIG. 3, and FIGS. 5 and 6 are used state diagrams of a reagent vessel assembly according to the present invention.

As illustrated in FIGS. 1 to 6, a reagent vessel assembly A according to the present invention is configured by a holder 100 made of steel and a reagent vessel 200 held on the holder 100.

The reagent vessel 200 is stuck to the steel holder 100 by magnetic force to be maintained in an upright state.

Specifically, the reagent vessel 200 is configured by a bottle 210 in which a reagent is contained, a Pasteur pipette 220 which is inserted into an open end of the bottle 210 and has a nozzle 221 through which the reagent is discharged, a cap 230 which closes the Pasteur pipette 220 and is fastened to the bottle 210, and a magnetic mold 240 which is coupled to the bottle 210. The reagent vessel 200 is made of synthetic resin. However, the material may be changed to a glass metal material.

The bottle 210 has an inner containing space and is formed in the form of a container with an opening 211 open on the upper surface thereof.

In addition, the bottle 210 is formed with a first gripping groove 212 that may be gripped by a user.

In addition, a male screw 213 is formed at the upper end of the bottle 210.

Meanwhile, a print or sticker is attached to the outer surface of the bottle 210 so that a product brand and product contents are displayed.

The Pasteur pipette 220 has an insertion member 222 inserted into the opening 211 of the bottle 210, and a stopper 223 is formed along the rim of the insertion member 222 to close the opening 211.

The cap 230 is formed with a female screw (not illustrated) screwed to correspond to the male screw 213 of the bottle 210 and a second gripping groove 231 that may be gripped by the user. At this time, the second gripping groove 231 is formed to match the shape of the first gripping groove 212 when the cap 230 is coupled to the bottle 210. The matched shape is an ellipse.

In addition, a print or sticker is attached to the cap 230 so that a product brand, product contents, and the like are displayed.

The magnetic mold 240 is fastened to the bottle 210 and has the same cross-sectional shape as a flat section of the bottle 210.

In addition, a magnet accommodating groove 241 is formed inside the magnetic mold 240, and a magnet 242 is accommodated in the magnet accommodating groove 241. Accordingly, the magnet 242 is attached to the steel holder 100 by magnetic force, so that the reagent vessel 200 of the present invention may be maintained in an upright state.

In addition, a pair of flanges 243 surrounding the bottle 210 is formed in the magnetic mold 240. Accordingly, when the magnetic mold 240 and the bottle 210 are coupled to each other by the flanges 243 to prevent distortion.

Furthermore, as the magnetic mold 240 and the bottle 210 are attached to each other by adhesive fusion, the flanges 243 serve to guide the coupling position when the magnetic mold 240 and the bottle 210 are coupled to each other.

Meanwhile, the nozzle 221 of the Pasteur pipette 220 is formed to have a cross-sectional area to be decreased toward the end. Accordingly, the end of the nozzle 221 having the small cross-sectional area is configured to reduce the surface tension with the discharged reagent so that the discharged reagent free-falls.

The nozzle 221 extends to the inside of the Pasteur pipette 220 to form a protruding extension end 221*a*.

In addition, a through hole 221*b* is formed across from the end of the nozzle 221 to the extension end 221*a*.

Accordingly, when the user turns over and grips the reagent vessel 200, the reagent gathers at the extension end 221*a* and around the extension end 221*a*, and when the user grabs the bottle 210, a drop of reagent falls through the through hole 221*b* at the end of the nozzle.

At this time, the discharge amount of the reagent is determined by the cross-sectional area of the end of the nozzle 221 and the length and diameter of the through hole 221*b*, and generally discharged in 20 μl (±1 μl).

Finally, the holder 100 is formed to be bent in a '¬' shape. Accordingly, as illustrated in FIG. 5, the cap 230 of the reagent vessel 200 is configured to face the user so that the user may easily grip the reagent vessel 200 while checking the contents of the reagent vessel 200.

According to the present invention, the reagent vessel 200 having the magnet attached thereto sticks to the steel holder 100, and thus it is possible to stably hold the reagent vessel 200 so as to maintain the reagent vessel 200 in an upright state during use and storage thereof.

At this time, it is possible to prevent the leakage of the reagent by maintaining stably the reagent vessel in the upright state by magnetic force even while the cap 230 of the reagent vessel 200 is removed.

As described above, although the preferred embodiment of the present invention have been described in detail, the technical scope of the present invention is not limited to the above-described embodiments and should be interpreted according to the appended claims. At this time, those skilled in the art will understand that many modifications and variations may be made without departing from the scope of the present invention.

The invention claimed is:

1. A reagent vessel comprising:

a bottle in which a reagent is contained, wherein a male screw is formed at an upper end of the bottle, and a first gripping groove is formed on the bottle;

a Pasteur pipette having an insertion member inserted into an open end of the bottle, a stopper formed along a rim of the insertion member to close the opening, and a nozzle through which the reagent is discharged;

a cap having a female screw screwed to correspond to the male screw of the bottle and formed with a second gripping groove, wherein, when the cap is coupled to the bottle, the second gripping groove is formed to match a shape of the first gripping groove, and a matched shape of the first gripping groove and the second gripping groove is an ellipse; and a magnetic mold attached to the bottle by adhesive fusion and having a same cross-sectional shape as a flat section of the bottle, wherein a pair of flanges surrounding the bottle are formed in the magnetic mold, and the pair of flanges serve to prevent distortion between the magnetic mold and the bottle and to guide a coupling position therebetween.

2. The reagent vessel of claim 1, wherein a magnet accommodating groove is formed inside the magnetic mold, and a magnet is accommodated in the magnet accommodating groove.

3. The reagent vessel of claim 1, wherein the nozzle of the Pasteur pipette is formed to have a cross-sectional area to be decreased toward an end of the nozzle, and an end of the nozzle having a small cross-sectional area is configured to reduce a surface tension with a discharged reagent so that the discharged reagent free-falls, and wherein the nozzle extends to an inside of the Pasteur pipette to form a protruding extension end, and a through hole is formed across from an end of the nozzle to the extension end.

4. A reagent vessel assembly comprising:

a holder made of steel; and the reagent vessel of claim 1 held on the holder, wherein the reagent vessel is struck to the steel holder by magnetic force to be maintained in an upright state.

5. The reagent vessel assembly of claim 4, wherein the holder is formed to be bent in a '¬' shape.

* * * * *